Feb. 3, 1925.  
J. H. McDONALD  
COFFEE URN  
Filed Dec. 8, 1923  
1,525,310

Witnesses:

Inventor:  
James H. McDonald  
By Joshua H. Potts  
His Attorney.

Patented Feb. 3, 1925.

1,525,310

UNITED STATES PATENT OFFICE.

JAMES H. McDONALD, OF CHICAGO, ILLINOIS.

COFFEE URN.

Application filed December 8, 1923. Serial No. 679,283.

*To all whom it may concern:*

Be it known that I, JAMES H. MCDONALD, a citizen of the United States, and a resident of the city of Chicago, county of Cook, and State of Illinois, have invented certain new and useful Improvements in Coffee Urns, of which the following is a specification.

This invention relates to certain new and useful improvements in coffee urns and has for its principal object the provision of an improved construction of this character which will be highly efficient in use and economical in manufacture.

The approved coffee urns now commercially in use ordinarily consist of an outer vessel having its walls formed of metal such as copper, and an inner vessel supported upon what is commonly known as a toadstool and this vessel is commonly formed of earthenware. These two vessels at the upper end of the inner vessel are usually fastened or fixed together by means of a copper ring or the like and this copper ring is ordinarily soldered or welded to the peripheral walls of the outer vessel and in soldering this ring to said peripheral walls there usually remains after completion of the work a bluish ring caused by the heat used to complete the soldering work and this bluish ring mars the æsthetic appearance of the urn. The use of heat to complete the welding or soldering work also causes the metal to buckle and warp at the point of welding and this likewise mars the outer appearance of the vessel. It is therefore one of the principal objects of the invention to provide a simple arrangement for securing these two vessels properly together.

Other objects will appear hereinafter.

The invention consists in the combination and arrangements of parts hereinafter described and claimed.

The invention will be best understood by reference to the accompanying drawing, showing the preferred form of construction and forming a part of this specification, and in which, Fig. 1 is a side elevation view of a group of coffee urns embodying the invention, showing one of the urns in section to best illustrate the invention;

Figure 1:
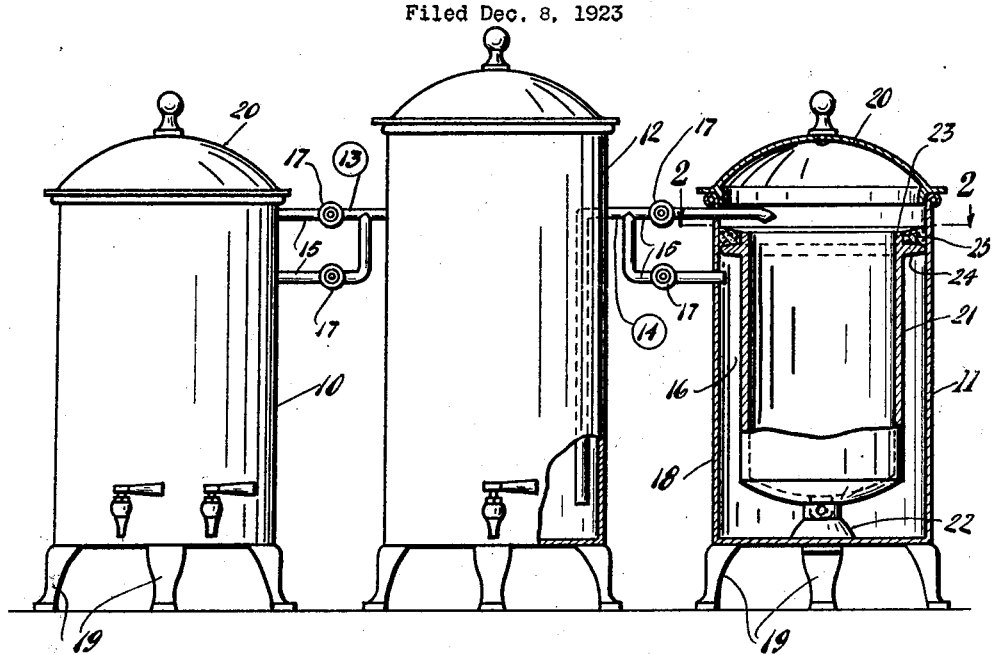
Figure 2:
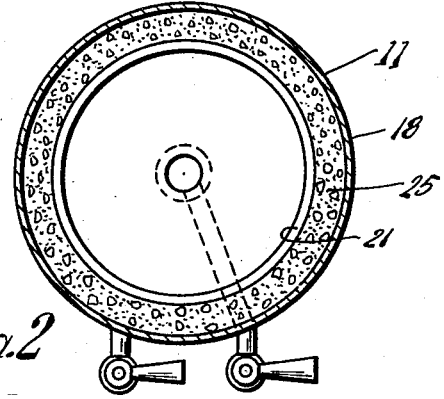
Fig. 2 is a sectional view taken substantially on line 2—2 of one of the coffee urns illustrated in Fig. 1.
Figure 3:
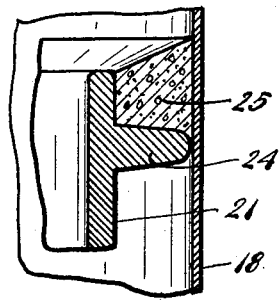
Fig. 3 is an enlarged sectional view showing the construction embodying the connection between the inner and outer vessels of the urn.

In the drawing I illustrate the preferred form of construction and 10 and 11 indicate coffee urns and 12 a hot water urn. Communication between the urns is accomplished by means of what is known in the art as siphon pipes 13 and 14 each comprising branch pipes 15 one of which conveys hot water to the inner vessel and the other conveys hot water to the space 16 between the inner vessel and outer vessel of the urn and these pipes are preferably controlled by hand operated valves 17. The outer vessel of the urn 11 is indicated at 18 and the peripheral walls of this vessel are preferably formed of the usual metal used in constructing urns of this character and this vessel is mounted upon suitable legs 19 and is provided with a removable cover 20. The inner vessel is indicated at 21 and is preferably formed of the usual earthenware and is mounted upon what is commonly called a toadstool 22. This vessel adjacent the top thereof is connected to the walls of the outer vessel in the following manner.

At a point located preferably a short distance from tne top edge 23 of the vessel 21 I form an integral annular flange or ring 24 having a cross diameter a trifle short of the inner diameter of the outer vessel 18 to permit mounting this inner vessel within the outer vessel without bulging with the walls of the latter. This flange serves as a bed or support for adhesive material such for example as cement and this adhesive material is indicated at 25 and extends around the inner vessel 21 above the supporting flange 24 and has a top surface which tapers downwardly toward the top edge 23 of the inner vessel. This adhesive material can be of any of the well-known forms which will best serve the purpose especially the purpose of providing a tight union between the two vessels.

From the illustrations in the drawing and from the description herein it will be seen that I provide a simple arrangement for joining the two vessels together without in any way marring or disfiguring either of the vessels and that the arrangement can be embodied as a part of the urn at an economical cost.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A coffee urn including an inner and outer vessel with a space between said vessels, an integral flange formed on the inner of the vessels adjacent the top peripheral edge thereof, a ring of cement above said flange for joining said vessels together adjacent the top peripheral edge of the inner vessel.

2. A coffee urn including an inner and outer vessel with a space between said vessels, an integral flange formed on the inner of the vessels adjacent the top peripheral edge thereof, and a ring of cement mounted upon said flange and sloping up from said top edge to said outer vessel for securing said vessels air-tight together.

In testimony whereof I have signed my name to this specification in the presence of two subscribing witnesses.

JAMES H. McDONALD.

Witnesses:
JOSHUA R. H. POTTS,
FREDA C. APPLETON.